United States Patent [19]

Prasad et al.

[11] Patent Number: 5,675,511
[45] Date of Patent: Oct. 7, 1997

[54] APPARATUS AND METHOD FOR EVENT TAGGING FOR MULTIPLE AUDIO, VIDEO, AND DATA STREAMS

[75] Inventors: Rama R. Prasad; Ram V. Chary, both of Beaverton, Oreg.

[73] Assignee: Intel Corporation, Santa Clara, Calif.

[21] Appl. No.: 576,519

[22] Filed: Dec. 21, 1995

[51] Int. Cl.$^6$ .................................... H04Q 3/54
[52] U.S. Cl. ............................ 364/514 A; 348/7
[58] Field of Search .................. 364/514 R; 380/19; 348/7, 467; 340/825.14; 370/60, 61, 47, 99

[56] References Cited

U.S. PATENT DOCUMENTS 4,688,247 8/1987 Davidov ........................ 380/19
4,780,758 10/1988 Lin et al. ........................ 348/7
5,517,250 5/1996 Hoogenboom et al. ............... 348/467

Primary Examiner—Ellis B. Ramirez
Assistant Examiner—Thomas Peeso
Attorney, Agent, or Firm—William H. Murray; N. Stephan Kinsella

[57] ABSTRACT

A method, apparatus, and storage medium for event tagging of at least one audio, video, or data (AVD) stream, each AVD stream comprising a plurality of AVD stream chunks. According to a preferred embodiment, the at least one AVD stream is stored. An event tag is stored in response to a signal indicating the beginning of an event, the event tag having an event stream information data (ESID) structure comprising an ESID entry for each AVD stream of the at least one AVD stream, each ESID entry comprising an offset for locating a corresponding AVD stream chunk of each active AVD stream of the at least one AVD stream.

50 Claims, 6 Drawing Sheets

APPARATUS AND METHOD FOR EVENT TAGGING FOR MULTIPLE AUDIO, VIDEO, AND DATA STREAMS

BACKGROUND OF THE INVENTION

1. Field of the Invention

The present invention relates to data processing systems, and, in particular, to apparatuses and methods for providing for event tagging for multiple audio, video, and data streams.

2. Description of the Related Art

In computer systems, there is a need for storage and retrieval of various types of data streams. These data streams can be audio data streams, video data streams, or other types of (non-video, non-audio) data streams. There is often a need to store (and retrieve) multiple streams of such data, and to maintain the temporal synchronization of such data so that, upon retrieval or playback, streams that occurred simultaneously maintain the correct time synchronization. Audio, video, and data streams sometimes referred to collectively herein as "A/V/D streams," and storage and retrieval of A/V/D streams is (also referred to as record and playback, or write and read, of such data. In computer systems such as data conferencing (or "teleconferencing") systems, a plurality of users are provided with the ability to have an electronic on-line meeting even if the users are not physically in the same room or building. Using application programs for this purpose, modern communication systems have enabled the ability to have a "meeting" wherein all users participate in the meeting through their individual computer systems and share data, graphics, text, and other types of information. Users may communicate with one another, sharing data in the form of graphical images, text, or other "annotations" and other information represented on the computer system display. This is analogous to a meeting where participants in a face-to-face meeting may display information to one another on a whiteboard and other participants may add annotations, delete, or otherwise modify the board. In some usages, video data may also be shared among a plurality of connected users during such teleconferences, or video conferences. For such an electronic conferencing system, it is desirable for individual users to be able to selectively record (and play back) any or all of the individual A/V/D streams that constitute the data conference.

Some current methods, such as those using the Microsoft® audio-video interleave ("AVI") file standard, allow the recording and indexing of A/V/D streams. Current techniques utilizing such interleave formats, however, do not provide an efficient means of locating (seeking) given time-points within the A/V/D recording, especially when the various streams are not all simultaneously recorded (e.g., some streams are paused and resumed while others are still continuously recorded). Further, once a particular location in the file has been seeked which corresponds to a particular time-point, such current methods do not provide a means for selectively reading one or more of the streams while maintaining synchronization between those streams. Thus, prior art indexing and synchronization methods suffer from several disadvantages. There is, therefore, a need for methods and apparatuses that provide for temporal indexing for synchronized storing and retrieval of multiple audio, video, and data streams.

There is also a need to be able to retrieve and playback certain defined events that occur during a data conference. Current methods, such as those utilizing the AVI file format standard, do not provide a means for tagging an event within a given A/V/D recording which may be randomly accessed for playback. There is, therefore, a need for methods and apparatuses that provide for event tagging for synchronized storing and retrieval of multiple A/V/D streams.

Additionally, various A/V/D streams may be paused and resumed independently of one another during a data conference. There is, therefore, a need for methods and apparatuses for creation and management of multiple discontinuous segments of different types of data (i.e. A/V/D) streams in a single file.

SUMMARY

There is provided herein a method, apparatus, and storage medium for event tagging of at least one audio, video, or data (AVD) stream, each AVD stream comprising a plurality of AVD stream chunks. According to a preferred embodiment of the invention, the at least one AVD stream is stored. An event tag is stored in response to a signal indicating the beginning of an event, the event tag having an event stream information data (ESID) structure comprising an ESID entry for each AVD stream of the at least one AVD stream, each ESID entry comprising an offset for locating a corresponding AVD stream chunk of each active AVD stream of the at least one AVD stream.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

System Hardware

Figure 1:
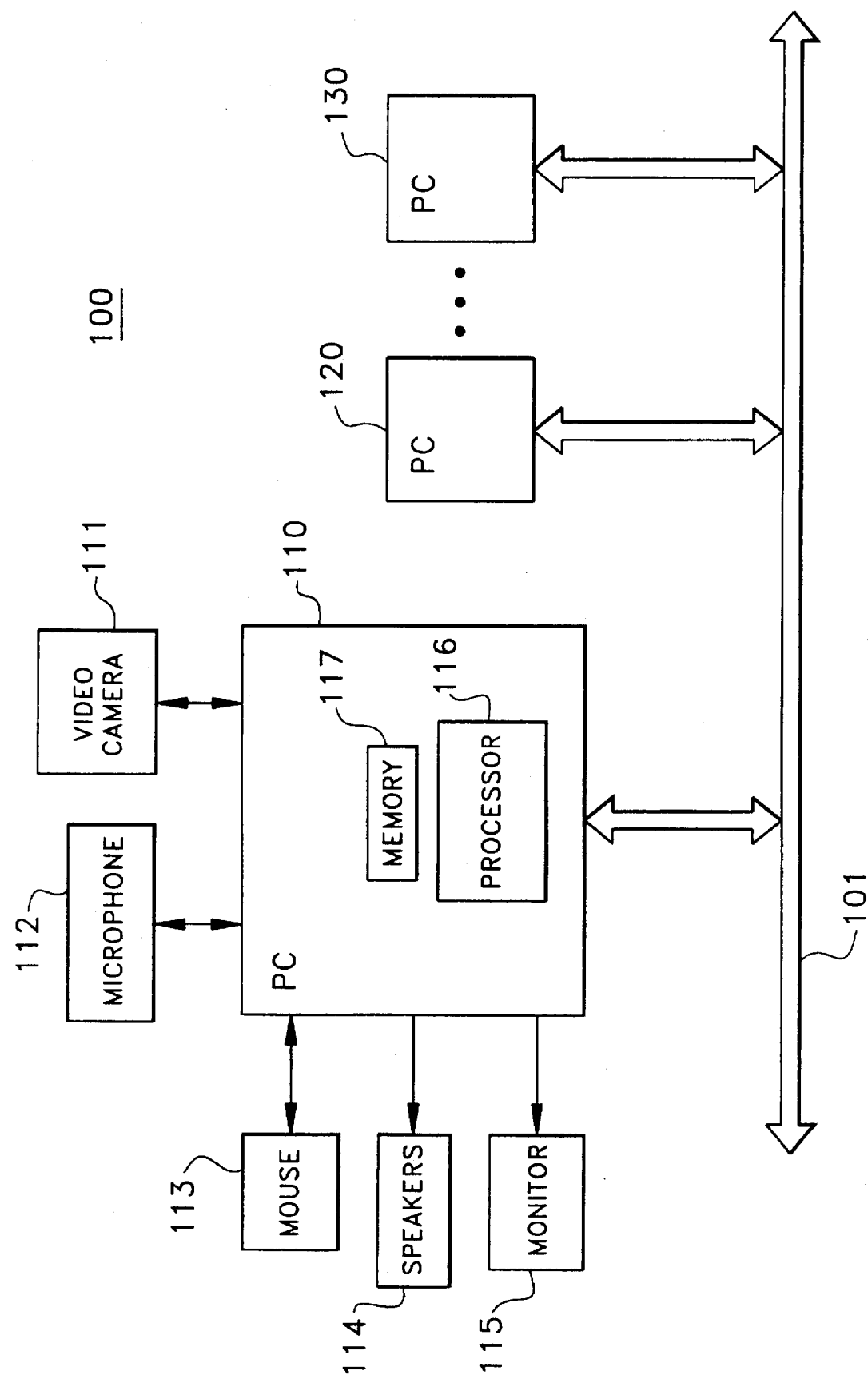
FIG. 1 shows a data conferencing system in accordance with a preferred embodiment of the present invention.

Referring now to FIG. 1, them is shown data conferencing system 100, in accordance with a preferred embodiment of the present invention. Data conferencing system 100 comprises a plurality of nodes or personal computers ("PC") 110, 120, 130. Personal computer or node 110 comprises a processor 116, memory 117, video camera 111, microphone 112, mouse 113, speakers 114, and monitor 115. Nodes 110, 120, 130 and other nodes of the data conference are interconnected via medium 101. Medium 101 may be, for example, a communication channel such as an Integrated Services Digital Network ("ISDN"). As will be understood, various nodes of a conferencing system may be connected through a variety of communication media, including local area networks ("LANs"), plain-old telephone lines ("POTS"), sometimes referred to as public switched telephone networks ("PSTN"), and the like. In a multi-point conferencing system, a plurality of multi-point conferencing units ("MCUs") may also be utilized, as will be understood by those skilled in the art, to transmit data to and from various nodes or "endpoints" of the conferencing system. Nodes and/or MCUs may be interconnected via an ISDN link or through a local area network ("LAN"), in addition to various other communications media. Those skilled in the art will appreciate that nodes of a conferencing system may, in general, be connected directly to the communications medium such as a LAN or through an MCU, and that a conferencing system may comprise other nodes or elements such as routers or servers.

Processor 116 is preferably a general-purpose programmable processor, such as an Intel® Pentium™ processor. Those skilled in the art will also appreciate that processors of nodes of conferencing system 100 may also be a special-purpose video processor such as the Intel® 82750PB. As will be appreciated, the various peripherals and components of a node such as those of node 110 may vary from those of other nodes. Thus, node 120 and node 130 may be configured identically to or differently than node 110, as will also be understood. It will further be understood that a node may be implemented on any suitable computer system in addition to personal computer systems.

As explained, each node 110, 120, 130 of a data conferencing system is used by a user (or "agent") of the conference. In a preferred conferencing system, a distributed approach is used wherein each of the nodes maintains local copies of the conferencing structure (sometimes referred to as a "meeting"), which are to be consistent with one another. Using application programs such as video conferencing applications, all users participate in the meeting through their individual PCS and share data, graphics, text, and other types of information. Users may communicate with one another, sharing data in the form of graphical images, text, or other "annotations" and other information represented on a display such as one displayed on monitor 115 of PC 110.

Thus, as will be understood, in a typical data conferencing session there are several A/V/D streams of various types. At any given time during the conference, there are a particular number of such streams in existence. Each A/V/D stream may have a start time, end time, and length independent of other A/V/D streams that constitute the data conference. Thus, some A/V/D streams overlap temporally, some have the same start and end times, and some do not overlap temporally at all (i.e. one ends before the other begins). As an example, users 1, 2, an 3 may begin and end a data conference substantially simultaneously. The data conference may last for, say 30 minutes, from minute 0 to minute 30. User 4 may enter at minute 1 and exit the conference at minute 10, while user 5 may enter the conference at minute 20 and exit at minute 25. As will be understood, each user may have associated at least an audio and a video stream. Other streams may also be part of the conference, such as an audio and video stream from a third-party supplier, such as a news channel, which is viewed or accessible by the participants of the conference.

Temporal Indexing

In a preferred embodiment, there is provided a method and apparatus that provide for temporal indexing for synchronized storing and retrieval of multiple audio, video, and data streams. As described in further detail hereinbelow, the present temporal indexing invention provides a means for efficient seeking to any specific point in time within a given A/V/D recording (i.e. file), even when the various streams are not all simultaneously recorded (e.g., some streams are paused and resumed while others are still continuously recorded). As will be appreciated, a particular A/V/D recording comprises any number of audio, video, and/or data streams, which need not have identical start times, end times, or lengths. The present invention further provides a means for selectively retrieving, in a fully synchronized manner and at any given point in time, any one or more of the A/V/D streams in the A/V/D recording.

Figure 2:
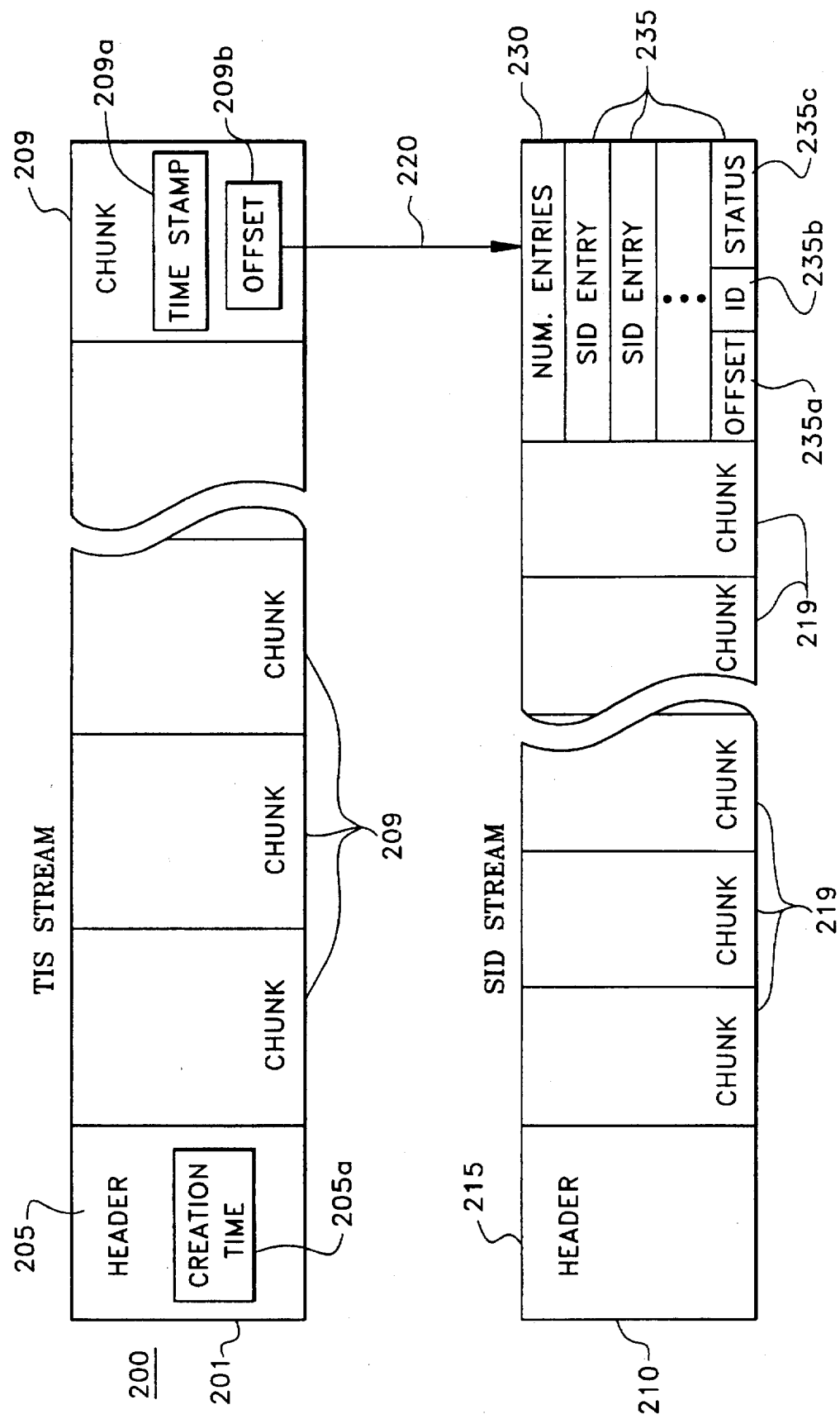
FIG. 2 shows a multi-stream temporal indexed file format in accordance with a preferred embodiment of the present invention.

In a preferred embodiment, the present invention provides a means for recording a temporal-index stream in a file, provided at least two A/V/D streams are being recorded. This allows random access, or seek, to any time point within the A/V/D recording. Additionally, the present invention allows immediate recovery of one or more streams that was recorded at that time-point, while maintaining synchronization between the retrieved streams. Referring now to FIG. 2, there is shown a preferred multi-stream temporal indexed ("MSTI") file format 200 in accordance with a preferred embodiment of the present invention. As illustrated in FIG. 2, during recording of at least two A/V/D streams by a user of a data conferencing system, MSTI file format 200 comprises a temporal-index stream ("TIS") 201, having a TIS stream header 205 and a plurality of TIS chunks 209. Each TIS chunk 209 represents a time-point in the recording. TIS chunks 209 are added at regular intervals so that any particular moment during the conference may be accessed. Each TIS chunk 209 is of fixed size and is also relatively small so as to allow for random accessing of particular TIS chunks (corresponding to particular time-points in the conference).

MSTI file format 200 also comprises a "helper stream" referred to herein as the stream information dam ("SID") stream 210, which comprises an SID stream header 215 and plurality of SID chunks 219 having a variable size. Each (small, fixed-size) TIS chunk 209 contains a pointer which points to a corresponding SID chunk 219. In a preferred embodiment, each TIS chunk 209 comprises a double-word (i.e., 32-bit) TIS chunk time stamp field 209a and a double-word (32-bit) TIS chunk offset 209b into the SID stream 210. As will be appreciated by those skilled in the art, time-stamp field 209a is the millisecond offset at which the particular TIS chunk 209 was generated. Thus, the time stamp of time stamp field 209a of a particular TIS chunk 209 is the offset from the time that the TIS stream 209 was created.

The TIS stream 201 is typically created at the same time the A/V/D recording of the conference is begun. The creation time of the TIS stream 201 itself is stored in the TIS stream header 205, as illustrated by creation time field 205a. TIS chunk offset 209b acts as the pointer described above. Thus, offset 209b provides for the offset into the corresponding SID chunk 219 of the SID stream 210, as shown by arrow 220 in FIG. 2.

Each SID chunk 219 comprises an array of SID entries 235, with one SID entry 235 for each stream that is being recorded by the user at the time of the event. In a preferred embodiment, each SID entry 235 is 12 bytes long, and contains three 32-bit fields 235a, 235b, 235c. As will be appreciated, A/V/D streams are stored in memory as a stream of data broken into smaller units, in accordance with the type of data stream. These discrete units of a stream, or chunks, may consist of, for example, video frames or pictures for video streams, or audio samples of a given length (e.g., one-fifth or one-tenth of a second) for audio streams. Each chunk of a stream thus corresponds to a unique time-point during the conference at which that part of the stream occurred. Offset field 235a is, therefore, a pointer to the corresponding chunk for the stream corresponding to the SID entry 235, where the chunk corresponds to the time-point in the stream corresponding to the particular SID entry 235. As will be understood, each A/V/D stream of a conference is associated with a unique identifier by application programs supporting such conferences. Stream ID field 235b thus comprises information identifying the corresponding A/V/D stream. Stream status field 235c indicates the status of the associated stream, i.e. whether the stream is active or not (i.e. whether it is being recorded), or whether the stream, if active, is currently paused or not. (Some streams may temporarily be paused, or muted, by the user during recording for various reasons.)

Figure 3:
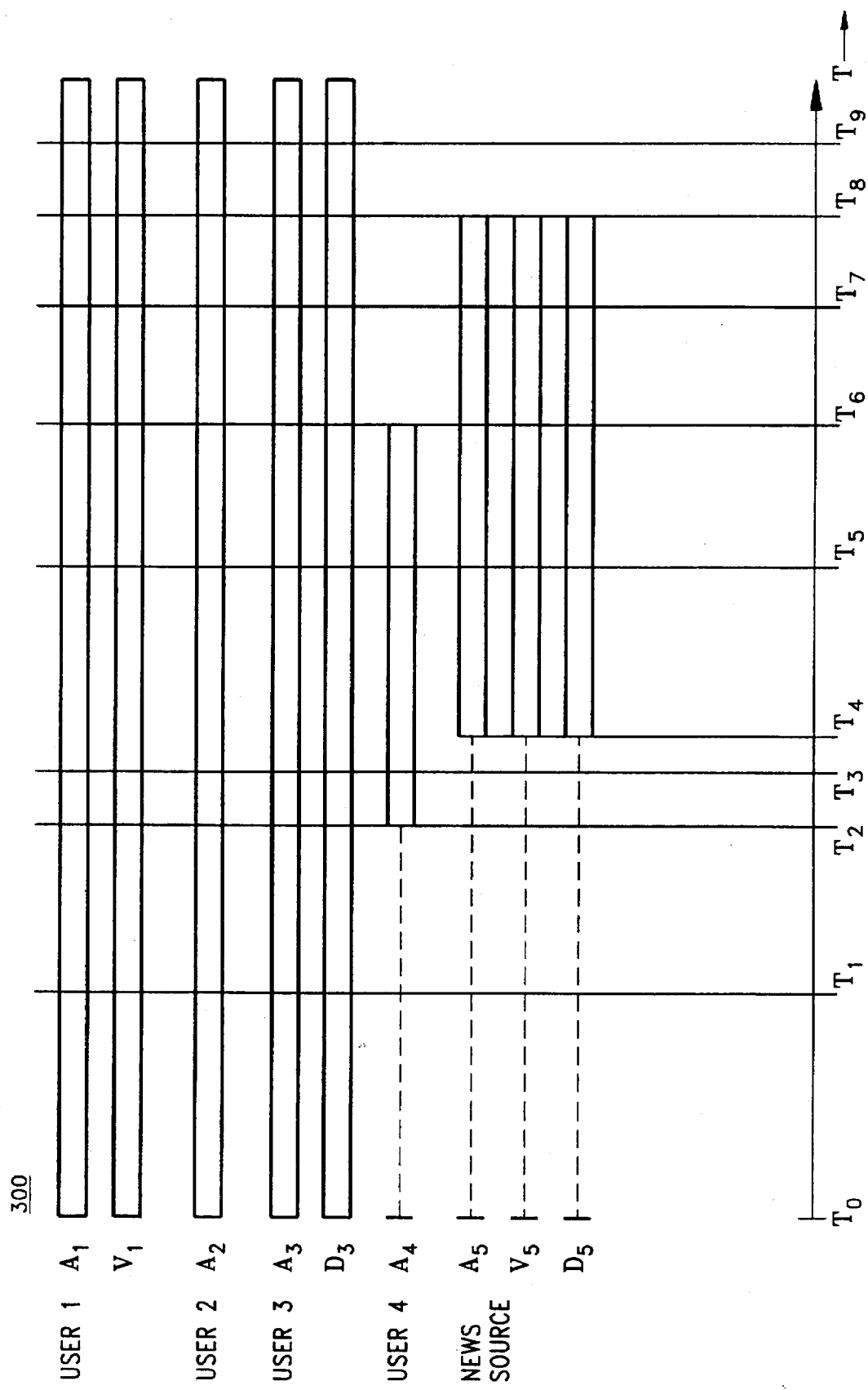
FIG. 3 depicts an illustrative data conference with a plurality of data streams in accordance with a preferred embodiment of the present invention.

Each SID chunk 219 is thus of variable size because different numbers and types of A/V/D streams may exist, and/or be recorded, at given time-points of the data conference. For example, at a first time-point in a data conference, there may be three audio streams and one video stream, while at a later point in time there may be a larger or smaller number of such types of A/V/D streams. Referring now to FIG. 3, there is shown an illustrative data conference 300 with a plurality of A/V/D streams in accordance with a preferred embodiment of the present invention. As illustrated, at time $T_0$, the data conference comprises three users. Each participant in the conference is able to view the video stream $V_1$ of user 1, and the audio streams $A_1$, $A_2$, and $A_3$ of each of users 1, 2, and 3, respectively, may be heard through speakers on each user's data conferencing system. Additionally, a data stream $D_3$ Of user 3 may also be shared by each participant in the conference. Thus, the users may be sharing only the video stream originating from user 1, if the local video of the other users is not relevant, but listening to the audio streams of all users so that their comments about video stream $V_1$ may be heard. User 3 may also be supplying a data stream $D_3$, such as mouse pointer movements or the like. Thus, at any time from time $T_0$ to $T_2$, such as time $T_1$, the data conference comprises five total A/V/D streams, namely one video stream, three audio streams, and one (non-video, non-audio) data stream. At time $T_2$, user 4 may join the conference and exit at time $T_6$, as illustrated. Thus, at time $T_3$, there is an additional audio stream, $A_4$. Similarly, at time $T_4$, an A/V/D source such as a news source having streams $A_5$, $V_5$, and $D_5$, may be added to the conference. These streams may represent, for example, audio and video data displaying information from a cable news channel, and data stream $D_5$ may represent stock ticker information, information about the content of other available channels, or the like.

The time during the conference is divided into a plurality of discrete, small time intervals sufficient to allow accurate accessing of selected time-points in the conference. For example, the time-points may correspond to each tenth or half of a second. As will be appreciated, the smaller the intervals represented by such time-points, the more such time-points and associated processor time and memory storage will be required. However, with smaller time intervals, more precise seeking of specific moments of the recorded data conference may be achieved. Conversely, a more coarse time-point (i.e., larger time-intervals) will require less processing and memory, but will not allow as free or precise seeking of the recorded streams of the conference. Additionally, with coarser time-points, synchronization of the streams desired to be played back will be more difficult to achieve. As will be understood, each such time-point corresponds to a TIS chunk 209 and also to an SID chunk 219. The corresponding SID chunk 219 comprises information about the state of the conference at the corresponding time-point, such as the number and types of currently-existing A/V/D streams and their locations in memory so that any or all of these A/V/D streams may be selectively retrieved by a user desiring to play back all or a portion of the conference. In a preferred embodiment, each user, or participant, in the data conference has the ability to selectively record any or all of the A/V/D streams of the conference. During such recording, or storage, of the selected A/V/D streams, TIS stream 201 and SID stream 210 are also created and stored, as described hereinabove. Each selected A/V/D stream to be recorded in a given sequence of the conference is stored independently, rather than mixed together, to allow for selective playback of any or all of the recorded A/V/D streams of the sequence.

As will be understood, the time stamp information stored in time stamp filed 209a for each time-point may be utilized by the user's data conferencing system processor to synchronize all retrieved fields. For example, after the data conference is ended and stored in a user's memory, he may seek to time $T_1$ and select retrieval and playback of only streams $A_1$, $V_1$, and $A_2$, thus omitting streams $A_3$ and $D_3$. These first three streams may be retrieved from memory and synchronized temporally utilizing the information contained in the corresponding TIS chunks 209 and SID chunks 219.

The present temporal indexing invention therefore provides a means for recording sequences of selected, multiple A/V/D streams with temporal indexing to allow for efficient seek and synchronous playback of selected A/V/D streams of the recorded sequence. With this invention and corresponding MSTI file format 200, a user using a browser/playback application can rapidly seek to any point in time within an A/V/D recording and have immediate synchronized access to any of the streams that were recorded at that point. As will further be appreciated by those skilled in the art, the present temporal indexing invention may be easily implemented within the context of industry-standard file formats such as the Microsoft® AVI file format.

Further details concerning a preferred embodiment of the present invention are presented in the Record and Playback Services Definition section and File Input/Output Services Definition section of this application, below.

Event Tagging

Figure 4:
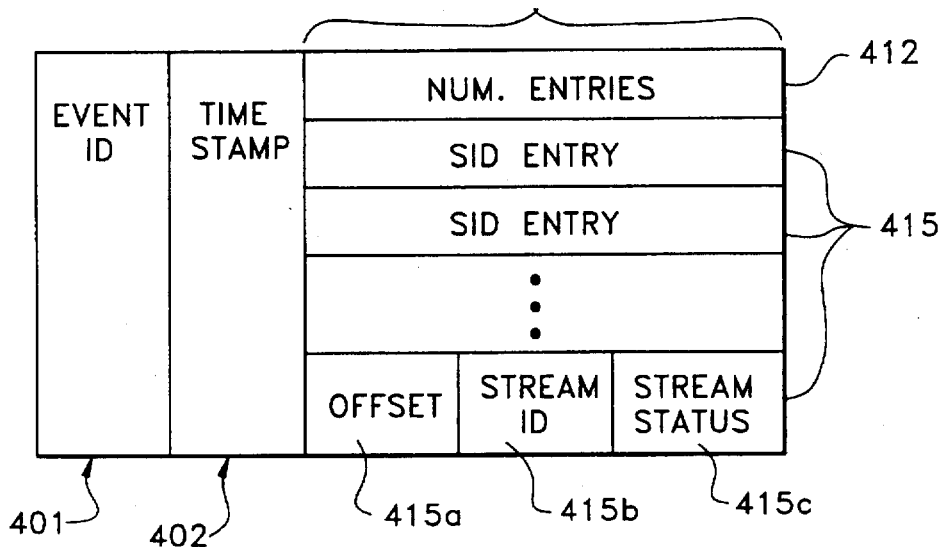
FIG. 4 shows a multi-stream event tag file format in accordance with a preferred embodiment of the present invention.

As explained hereinabove, there is a need to be able to retrieve and playback certain defined events that occur during a data conference. In a preferred embodiment of the present invention, there is provided a method and apparatus for event tagging and for synchronized storing and retrieval of multiple A/V/D streams. In a preferred file format in accordance with the present invention, a multi-stream event tag (MSET) format is utilized. Referring now to FIG. 4, there is shown an MSET file format in accordance with a preferred embodiment of the present invention. MSET file format comprises event tag 400, which is added during recording of an A/V/D conference or sequence comprising a subset of the streams of the conference in the manner described hereinabove. Event tag 400 comprises an event ID field 401, time stamp field 402, and event stream information data ("ESID") structure 410. ESID structure 410 comprises number of entries field 412 and an array of stream index data ("SID") entries 415. Each stream index entry 415 comprises an offset 415a, stream ID 415b, and stream status 415c.

Event ID field 401 is preferably a double-word (32-bit) unsigned integer, with 0 being a reserved value. This ID can be used by application programs to map a symbolic name to the event. As will be understood, for each event tagged during a recorded sequence of a data conference, an event tag 400 is created, each having a unique ID 401. This may be mapped to a symbolic name, such as "John's demonstration," "This is where Marcia slaps Kato," "Ayn Rand and Ludwig von Mises debated here," and the like, to describe the event being tagged. This tag is typically added for each defined or selected event. In typical usage, a signal is generated which indicates that a new event is beginning for which an event tage 400 should be created and stored, where the event signal is generated by a user. Alternatively, events may be generated automatically when certain types of events occur, for example when the scene changes or when certain computer recognizable images,sounds, or the like occur.

The time-stamp field 402 is preferably a double-word field that marks the absolute time of the beginning of the event being tagged. As will be understood, in alternative preferred embodiments relative time-stamps may be utilized as well. As will be appreciated, a sequence of events tagged may be stored and tracked in an event track, so that selected events of a plurality of tagged events may be seeked when desired by a user playing back a recording of the conference streams.

The ESID structure 410 comprises an array of SID entries 415, with one SID entry for each stream that is being recorded by the user at the time of the event. Thus, if seven streams exist in the conference at a given selected event at which time during the recording the user creates a corresponding event tag 400, the user may have selected, for example, only five of these seven streams to be recorded, as described in detail hereinabove with reference to FIG. 3. In this case, there will be five SID entries 415, one for each of the recorded streams, and number of entries field 412 will store the value five to indicate the number of such streams. In a preferred embodiment, each SID entry 415 is 12 bytes long, and contains three 32-bit fields 415a, 415b, 415c. In an alternative preferred embodiment, there is an SID entry 415 for each stream that exists in the conference, whether or not it is being recorded, but the SID entry 415 for unrecorded streams indicate, as explained below, that the stream is inactive. (i.e. not being recorded at the moment the event is tagged).

As will be appreciated, A/V/D streams are stored in memory as a stream of data broken into smaller units, in accordance with the type of data stream. These discrete units of a stream, or chunks, may consist of, for example, video frames or pictures for video streams, or audio samples of a given length (e.g., one-fifth or one-tenth of a second) for audio streams. Each chunk of a stream thus corresponds to a unique time-point during the conference at which that part of the stream occurred. Offset field 415a is, therefore, a pointer to the corresponding chunk for the stream corresponding to the SID entry 415, where the chunk corresponds to the time-point in the stream at the moment of the event tag. As will be understood, each A/V/D stream of a conference is associated with a unique identifier by application programs supporting such conferences. Stream ID field 415b thus comprises information identifying the corresponding A/V/D stream. Stream status field 415c indicates the status of the associated stream, i.e. whether the stream is active or not (i.e. whether it is being recorded), or whether the stream, if active, is currently paused or not. (Some streams may temporarily be paused, or muted, by the user during recording for various reasons.)

As will be understood by those skilled in the art, the event tagging of the present invention may be used by an application, such as a data conferencing application, to tag key events during the recording of conferencing sessions or sequences having subsets of the streams thereof. Symbolic names may be assigned to each event and mapped to the event tags for each event. Thereafter, a tagged event may be efficiently randomly accessed, i.e. seeked. Any or all of the streams recorded at that event may then immediately be retrieved and played back, while maintaining synchronization between all such streams, since the offset 415a for each active stream will allow the same time-point to be located for each A/V/D stream. With this invention and corresponding MSET file format, a user using a browser/playback application can rapidly seek to any tagged event within an A/V/D recording and have immediate synchronized access to any of the streams that were recorded at that point. As will further be appreciated by those skilled in the art, the present event tagging invention may be easily implemented within the context of industry-standard file formats such as the Microsoft® AVI file format.

The present event tagging invention therefore provides a means for event tagging and for synchronized storing and retrieval of multiple A/V/D streams.

Further details concerning a preferred embodiment of the present invention are presented in the Record and Playback Services Definition section and File Input/Output Services Definition section of this application, below.

A/V/D Stream Segment Management

As explained hereinabove, multiple A/V/D streams may be recorded in a single file using a variety of suitable file format techniques. When certain of the recorded streams are paused and resumed during recording, for example during a data conference, discontinuous streams are created and need to be managed for record and playback. A continuously recorded portion of a stream (e.g., between pauses) is referred to herein as an A/V/D stream segment or segment. There is a need for accessing each segment independently, or to seek to a specified point (referenced either by time or by event tagging, as explained hereinabove) in any or all of the streams in such a file. There is, therefore, a need for methods and apparatuses for creation and management of multiple discontinuous segments of different types of data (i.e. A/V/D) streams in a single file. This is accomplished in the present invention by use of a special "directory" stream that specifies a format to record information about every stream in a file. This directory stream can then be used by applications that play back such a file to display directory information, and to locate specif event- or time-points in one or more streams, thus allowing seek operations at the stream or file level.

Figure 5:
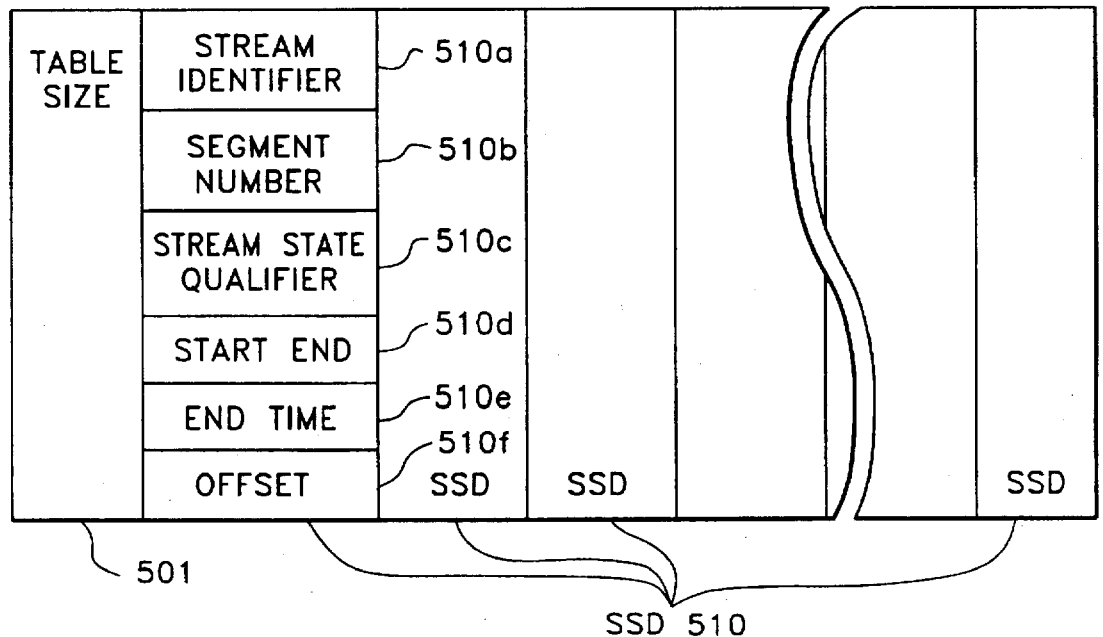
FIG. 5 shows a stream segment directory table in accordance with a preferred embodiment of the present invention.

Referring now to FIG. 5, there is shown a stream segment directory table ("SSDT") 500 in accordance with a preferred embodiment of the present invention. SSDT 500 comprises an array or table of stream segment directory ("SSD") entries 510, one SSD entry 510 for each continuous segment in the file. SSDT 500 also comprises a table size entry 501 which indicates the total number of SSD 510 entries in SSDT 500. As will be appreciated, table size 501 is useful in allowing an application program to determine the amount the memory space SSDT 500 needs, when used during processing of a recorded file.

Each SSD 510 comprises six fields, 510a–510f, which identify and characterize each continuous A/V/D stream segment of the file. As will be understood, each A/V/D stream of a conference is associated with a unique identifier by application programs supporting such conferences. Stream identifier 510a, preferably a 32-bit field, thus comprises information identifying the corresponding A/V/D stream from which the corresponding segment is derived. Segment number 510b, preferably a 32-bit field, is a number from 1 through N, where N is the total number of segments in the file. Thus, segment number 510b is a unique segment number for identifying the segment associated with the particular SSD 510. Stream state qualifier 510c is preferably a 32-bit field, and is used to indicate the status of the associated stream, i.e. whether the stream is active or not (i.e. whether it is being recorded), or whether the stream, if active, is currently paused or not. (Some streams, as explained above, may temporarily be paused, or muted, by the user during recording for various reasons.) Start time field 510d and end time field 510e are each preferably 32-bit fields, and are used to denote the start and end times of the relevant segment. Offset field 510f is an offset pointer, preferably 32-bits in size, that locates the beginning of the corresponding segment of this stream in the file.

As will be understood, SSDT 500 may be stored as a separate stream with its own chunk identifier ("ChunkID") in file formats such as the AVI format referenced hereinabove. In other suitable file formats that support multiple streams, whether interleaved or otherwise, an identifying mechanism similar to ChunkID may be used to store SSDT 500. Therefore, the present invention allows multimedia, or A/V/D, applications to flexibly and efficiently support record and playback of a variety of A/V/D streams, and allowing the creation of multiple segments within each stream that can result from pause/resume operations. The present invention thus serves as a general mechanism for creation and management of stream level information in a file that is used for recording multiple, discontinuous streams. Using SSDT 500, there is gained the capability to access randomly, as opposed to sequentially, any stream segment, thus making efficient seek operations possible. Also, the present invention thereby allows creation and use and/or retrieval of directory information of streams and their segments in a file.

Further details concerning a preferred embodiment of the present invention are presented in the Record and Playback Services Definition section and File Input/Output Services Definition section of this application, below.

Record and Playback Services Definition

Figure 6:
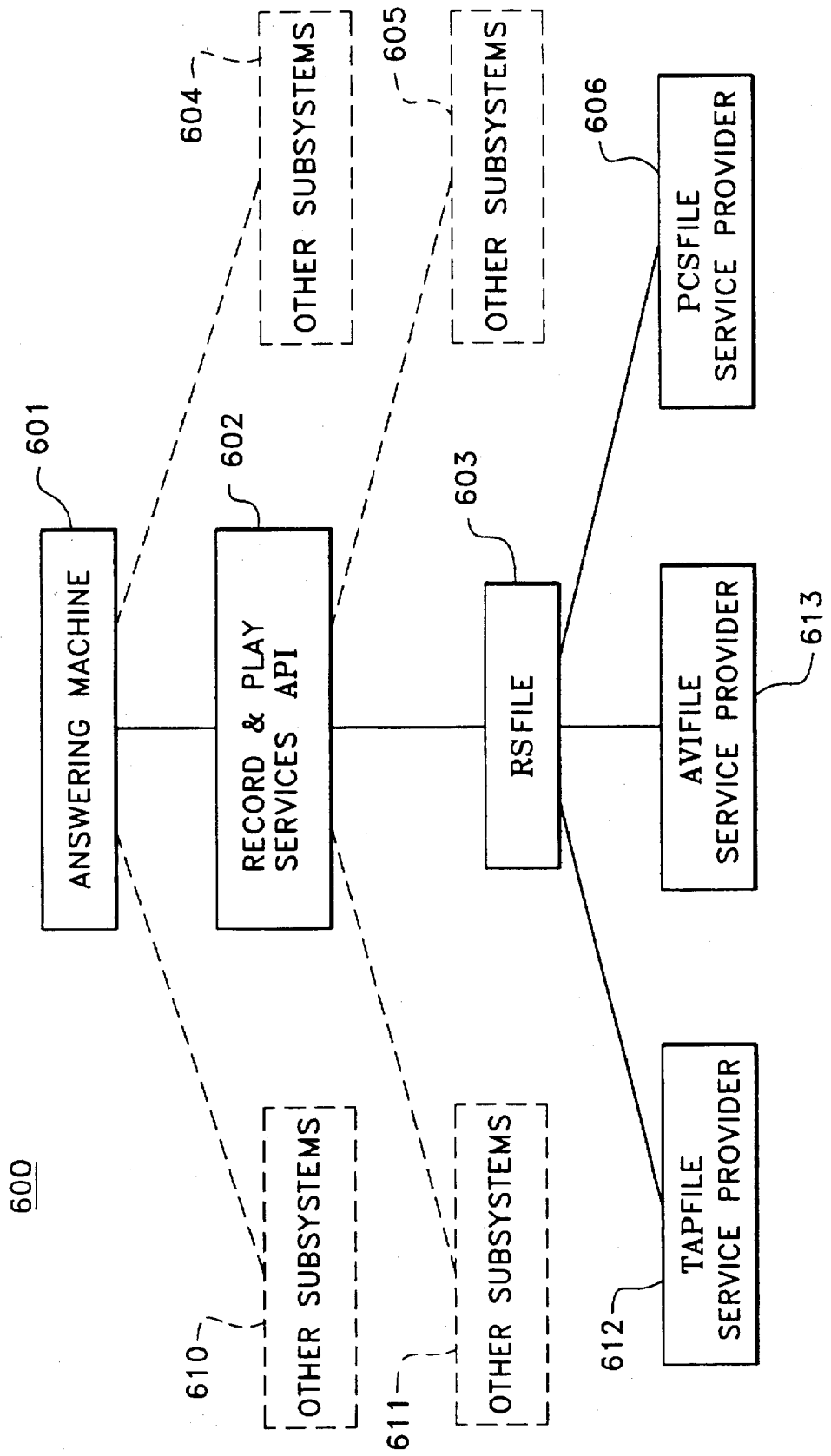
FIG. 6 illustrates a common record & play architecture, in accordance with a preferred embodiment of the present invention.

The following provides a description of a preferred record and playback services definition in accordance with a preferred embodiment of the present invention. The nomenclature employed hereinbelow will be understood by those skilled in the art. Several types of applications require record and playback support for recording A/V/D streams. The following describes a sharable set of services/modules that all such projects may use and an associated common record & play architecture 600 which is illustrated in FIG. 6. An associated high level file input/output ("I/O") API is described in the following section. Described in this section is the record and playback services layer, and the related set of functions needed by such record and play services to support record and playback requirements.

The following example serves to illustrate the common record & play architecture 600. Various applications may be utilized with data conference systems. For example, an A/V/D answering machine ("AVDAM") application may be used to record and play messages left by one user on another user's data conferencing personal node. This AVDAM is an example of an application that can use the record and play services, which in turn uses the high level file I/O API described in the following section of this application. Referring now to FIG. 6, there is shown diagram 600 which illustrates the record and play architecture, in accordance with a preferred embodiment of the present invention.

RPFile 603 implements the high level file I/O API which is discussed below. Various "service providers," hooked under RPFile 603, implement the actual support for these high level APIs in the specified low level file format. In the present example as illustrated in FIG. 6, the service providers shown are TAPFile Service Provider ("SP") 612, AVIFile SP 613, and PCSFile SP 606. When AVDAM 601 requests the creation/opening of a file through the record & play services, it specifies the required file format, as will be understood by those skilled in the art. Based on the requested file format, RPFile 603 loads the appropriate SP and carries out all the file I/O operations needed with the help of this service provider. The underlying file I/O is designed to support an arbitrary number of streams. Each of these streams is unique, with its own "streamID," which corresponds to the "fourCC" code found in the AVI file format. The record & play services in accordance with the present invention proposed adds support for the following features, in addition to the basic record and playback capabilities: Support for "file-scope" information like specific annotations/text data; support for "segment" information for each stream, allowing discontinuous stream recording and playback; support for "TimeTrack" ("TT"), allowing support for efficient search and seek mechanisms across all streams (file-level) or per stream; support for recording and using "Event" markers, with appropriate stream information appended; and global file scope information regarding the number of streams, specifics on each stream present, and the like.

Figure 7:
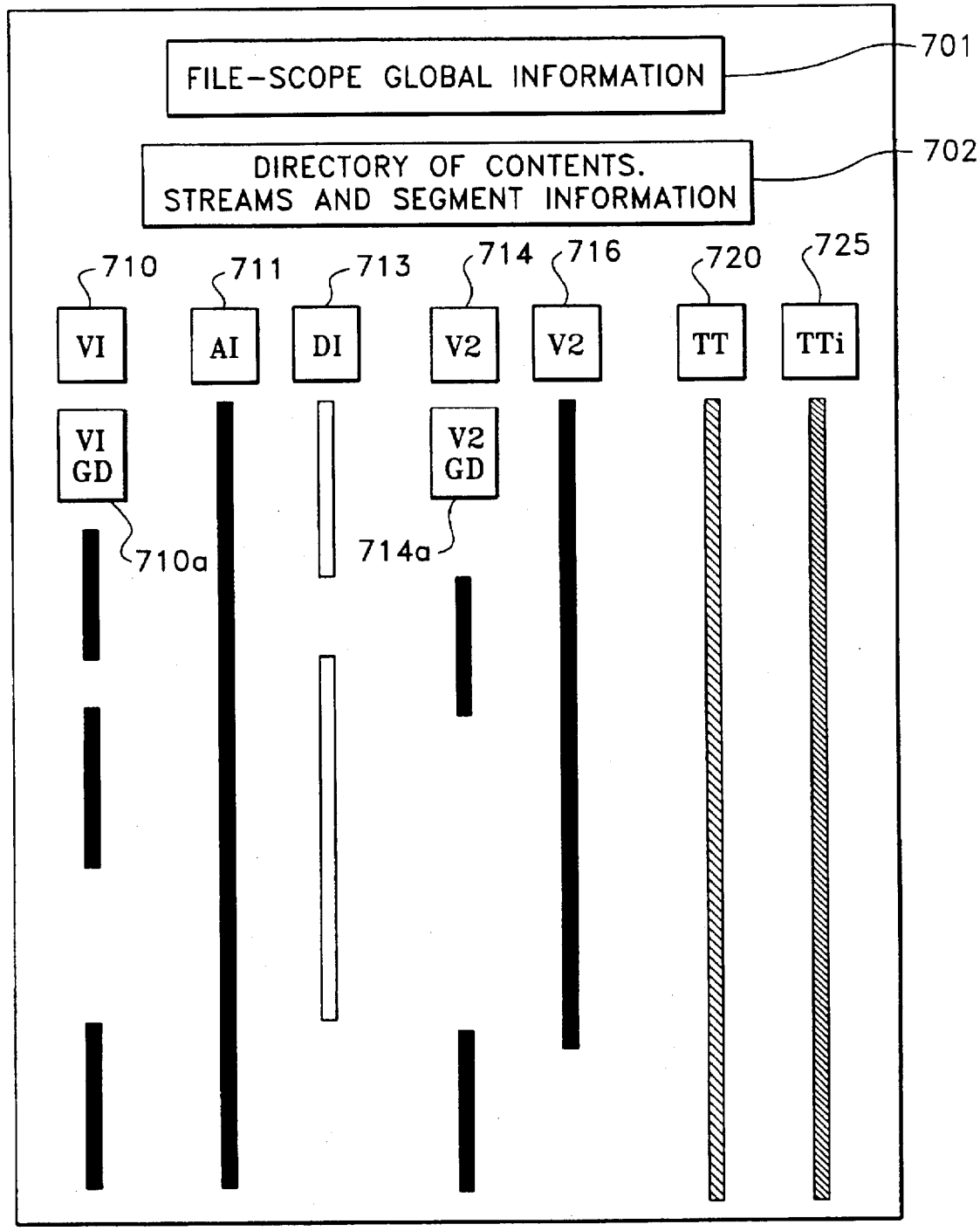
FIG. 7 shows an exemplary recorded file with multiple streams, in accordance with a preferred embodiment of the present invention.

Referring now to FIG. 7, there is shown an exemplary recorded A/V/D file 700 with multiple streams, in accordance with a preferred embodiment of the present invention. As illustrated, some of the streams are continuous while some have one or more discontinuous segments. All the information on different streams and their segmentation is maintained in a file-scope stream segment information track. The underlying file I/O system supports creation and reading of such file-scope global information. As illustrated in FIG. 7, V1 710 and V2 714 are video streams, and V1GD 710a and V2GD 714a represent video stream global data. A1 711 and A2 716 are audio streams, and D1 713 is a data stream. TT 720 is a time track stream and TTi 725 is its internal stream. Because the underlying File I/O supports file-scope global data and stream-scope global data read/write capabilities, it is easy to add any additional information like text annotations at the file scope and stream-specific information (e.g: KeyFrame markers in video streams).

Below are described a preferred API for record services and playback services, in accordance with the present invention.

Record Services

The record services described below are divided into two categories, file scope and stream-scope operations.

File-scope operations int RecordOpen(IN LPCSTR lpPath, IN DWORD dwFlags, IN UINT uFormat, OUT LP_FILE_HANDLE lphFileHandle)

lpPath—specifies a NULL terminated path for the file to be created dwFlags—specifies creation flags (APPEND/READ_WRITE etc.), segment/directory info creation etc.

uFormat—file format to be used (.AVI, .PCS, .TAP, etc.)

lphFileHandle—non-NULL if successful; NULL otherwise

Return value: zero if successful; otherwise, an error code such as

ERROR_FILE_CREATION
ERROR_BAD_ARGS
ERROR_FORMAT_UNSUPPORTED
int RecordClose(IN FILE_HANDLE hFileHandle)

Closes the file identified by hFileHandle. Also, RPFileWriteFileInfo( ) is invoked with the FILL_INFO structure duly filled up, to write out general information on this file.

return value-zero, if successful

Return value: zero if successful; otherwise, an error code such as

ERROR_FILE_CLOSING
ERROR_BAD_ARGS
int RecordFileEnable(IN FILE_HANDLE hFileHandle)

This function enables "streaming" of frames to all the open streams specified in the file pointed to by hFileHandle. This is useful especially with audio and video streams.

int RecordPause (IN FILE_HANDLE hFileHandle)

Pauses the recording of all open streams; also, updates the segment/directory information accordingly.

int RecordResume(IN FILE_HANDLE hFileHandle)

Resumes the recording of all open streams; also, updates the segment/directory information accordingly.

int RecordTimeTrackEnable(IN FILE_HANDLE hFileHandle , IN DWORD dwInterval)

Creates/continues a TimeTrack (see FileI/O API) with per-stream information stored at dwInterval periodicity. This is done until a RecordTimeTrackDisable( ) or RecordClose( ) is invoked.

int RecordTimeTrackDisable(IN FILE_HANDLE hFileHandle)

Discontinues TimeTrack int RecordMarkEvent(IN FILE_HANDLE hFileHandle, IN DWORD dwEventID)

Creates/adds an EventTrack (see File I/O API) with the specified EventID, storing per-stream information for all open streams Stream operations int RecordStreamCreate(IN LP_STREAM_HANDLE lphStreamHandle, IN UINT uStreamType, IN LP_STREAM_INFO lpStreamInfo)

lphStreamHandle—pointer to a StreamHandle uStreamType—specifies Video/Audio/Data stream type lpStreamInfo—pointer to an overlay structure indicating stream-specific information This function sets the handle of the stream, if created successfully, to a non-NULL value at lphStreamHandle. Otherwise, a NULL value is set at this location.

int RecordStreamClose(IN STREAM_HANDLE hStreamHandle)

hStreamHandle—StreamHandle

This function closes the specified stream.

int RecordStreamEnable(IN STREAM_HANDLE hStreamHandle)

hStreamHandle—handle to an open stream

Enables the recording of the specified stream; also, updates the segment/directory information accordingly.

This function allows streaming of audio/video frames to the appropriate stream in the file, if the stream handle specifies either an audio or a video stream.

int RecordStreamWrite(IN STREAM_HANDLE hStream, IN LPBYTE lpData, IN DWORD dwBufferSize, OUT LPDWORD lpdwBytesWritten)

hStreamHandle—handle to an open stream lpData—pointer to a buffer containing data to be written to the stream specified dwBufferSize—number of bytes to be written, contained in lpData lpdwBytesWritten—actual count of bytes written is returned in this location.

int RecordStreamPause(IN STREAM_HANDLE hStream)

Pauses the recording of the specified stream; also, updates the segment/directory information accordingly.

int RecordStreamResume(IN STREAM_HANDLE hStream)

Resumes the recording of the specified stream; also, updates the segment/directory information accordingly.

Playback Services

Playback services are divided into two general categories: file-scope operations and stream-scope operations.

File-scope Operations int PlayOpen(IN LPCSTR lpPath, IN DWORD dwFlags, IN UINT uFormat, OUT LP_FILE_HANDLE lphFileHandle)

lpPath—specifies a NULL terminated path for the file to be opened dwFlags—specifies file open flags (READ/READ_WRITE etc.)

uFormat—file format to be used (.AVI, .PCS, .TAP, etc.)

lphFileHandle—non-NULL if successful; NULL otherwise return value: zero, if no error; else, a defined error code ERROR_FILE_NOT_FOUND
ERROR_BAD_ARGS
ERROR_FORMAT_MISMATCH
int PlayClose(IN FILE_HANDLE hFileHandle)

Closes the file identified by hFileHandle return value-zero, if successful

Return value: zero if successful; otherwise, an error code such as

ERROR_FILE_CLOSING
ERROR_BAD_ARGS
int PlayGetFileInfo(IN FILE_HANDLE hFileHandle, OUT LP_FILE_INFO lpFileInfo)

Returns the file-scope information on this file specified by hFileHandle. The information is filled in to the FILE_INFO structure pointed to by lpFileInfo.

lpFileInfo—pointer to a buffer of type FILE_INFO int PlayEnable(IN FILE_HANDLE hFileHandle)

This function enables "streaming" of flames from all the streams specified in the open file pointed to by hFileHandle. This is useful especially with audio and video streams.

int PlayPause(IN FILE_HANDLE hFileHandle)

Pauses playing of all open streams; also, updates the segment/directory information accordingly.

int PlayResume(IN FILE_HANDLE hFileHandle)

Resumes the playing of all open streams; also, updates the segment/directory information accordingly.

int PlayGetTimeTrackInfo(IN FILE_HANDLE hFileHandle, OUT LP_TIME_TRACK lpTimeTrackBuffer, IN DWORD dwBufSize)

This function is to be used to obtain "TimeTrack" information from the file.

lpTimeTrackBuffe—a pointer to a buffer to read in the "Timetrack" information dwBufSize—specifies the size, in bytes, of the buffer pointed to by lpTimeTrackBuffer int Play GetEventTrackInfo(IN FILE_HANDLE hFileHandle, OUT LP_TIME_TRACK lpEventTrackBuffer, IN DWORD dwBufSize)

This function is to be used to obtain "TimeTrack" information from the file.

lpTimeTrackBuffe—a pointer to a buffer to read in the "Timetrack" information dwBufSize—specifies the size, in bytes, of the buffer pointed to by lpTimeTrackBuffer int PlayFileSeekEvent(IN FILE_HANDLE hFileHandle, IN DWORD dwEventID)

This function results in a seek operation to be done on the file. All the streams are positioned at the offsets obtained from an Event information entry, specified by dwEventID.

int PlayFileSeekTime(IN FILE_HANDLE hFileHandle, IN DWORD dwTimeStamp)

This function results in a seek operation to be done on the file. All the streams are positioned at the offsets obtained from the TimeTrack entry, specified by dwTimeStamp.

Stream information functions

The functions defined below assist in obtaining global information on supported streams, without opening any specific streams.

int PlayGetFirstStreamInfo(IN UINT uStreamType, OUT LP_STREAM_INFO lpStreamInfo, IN BOOL bMore)

Reads the StreamInfo for the "first" instance of the specified type of stream (audio, video or data); bMore indicates if there are more streams of the specified type in this file.

int PlayGetNextStreamInfo(IN UINT uStreamType, OUT LP_STREAM_INFO lpStreamInfo, OUT BOOL bMore)

Reads the StreamInfo for the "next" instance of the specified type of stream, relative to the stream specified in previous PlayGetFirstStreamInfo/PlayGetNextStreamInfo; bMore indicates if there are more streams of the specified type in this file.

Stream Open functions int PlayStreamOpen(IN DWORD dwStreamID, OUT LPSTREAM_HANDLE lphStream)

This function opens the stream specified by dwStreamID, if it exists.

dwStreamID—specifies the stream to be opened lphStream—pointer to a STREAM_HANDLE; filled in with the stream handle if PlayOpenStream is successful.

int PlayStreamClose(IN STREAM_HANDLE hStreamHandle)

hStreamHandle—StreamHandle

This function closes the specified stream.

Stream level seek functions int PlayGetSegmentInfo(IN STREAM_HANDLE hStreamHandle, OUT LP_SEG_INFO lpSegmentInfo)

This function is used to obtain "segment" information on an open stream. The information obtained may be used for a variety of purposes, including visual display of "slider bars" for each segment in a stream.

hStreamHandle—handle to an open stream lpSegmentInfo—pointer to a SEG_INFO structure, to read in segment info int PlayStreamSeek(IN STREAM_HANDLE hStreamHandle, IN DWORD dwOffSet)

This function results in a seek operation to be done on the specified stream. The stream is positioned at the offset specified by dwOffSet.

int PlayStreamSeekEvent(IN STREAM_HANDLE hStreamHandle, IN DWORD dwEventID)

This function results in a seek operation to be done on a stream. The stream specified by hStreamHandle is positioned at the offset obtained from an Event information entry, specified by dwEventID.

int PlayStreamSeekTime(IN STREAM_HANDLE hStreamHandle, IN D WORD dwTimeStamp)

This function results in a seek operation to be done on a stream. The stream specified by hStreamHandle is positioned at the offset obtained from a TimeTrack information entry, specified by dwTimeStamp.

int PlaySeekNextSegment(IN STREAM_HANDLE hStreamHandle)

This function results in a seek operation to be done on a stream. The stream specified by hStreamHandle is positioned at the offset obtained from a Stream Segment information entry, identified by this stream's ID.

Stream Read functions int PlayStreamRead(IN STREAM_HANDLE hStreamHandle, OUT LPBYTE lpBuffer, IN DWORD dwBufSize, OUT LPDWORD lpdwBytesRead)

hStreamHandle—handle to an open stream lpData—pointer to a buffer containing data to be read from the stream specified dwBufSize size of the buffer pointed to by lpData ldwBytesRead—actual count of bytes read is returned in this location.

int PlayStreamEnable(IN STREAM_HANDLE hStreamHandle)

This function enables "streaming" of frames from the open stream specified by hStreamHandle. This is useful especially with audio and video streams.

int PlayStreamPause(IN STREAM_HANDLE hStream)

Pauses the recording of the specified stream; also, updates the segment/directory information accordingly.

int PlayStreamResume(IN STREAM_HANDLE hStream)

Resumes the recording of the specified stream; also, updates the segment/directory information accordingly.

| Data Structures used |
|---|

```
struct TimeTrackS
{
    DWORD    dwTimeStamp;              //(relative/abs)time at this point,
                                       // in milliseconds
    DWORD    dwOffsetTimeTrackInfo;    //offset into TimetTrack stream
} TIME_TRACK;
struct StreamIndexEntry
{
    DWORD    dwStreamID;               //fourCC
    DWORD    dwStreamStatus;           //active, paused . . .
    DWORD    dwOffset;                 //"sample #"
}STREAM_INDEX_ENTRY;
struct TimeInfoChunk
{
    DWORD    dwNumIndexEntries;        //same as # of streams open now
```

```
                       Data Structures used

STREAM_INDEX_ENTRY   aStreamIndexEntries[dwNumIndexEntries];
}TIME_TRACK_INFO;
struct EventInfo
{
       DWORD      dwNumIndexEntries;   // # of open streams
       STREAM_INDEX_ENTRY   aStreamIndexEntries[dwNumIndexEntries];
}EVENT_INFO;
struct EventTrackS
{
       DWORD       dwEventID;         //event ID - unique
       DWORD       dwTimeStamp;       //time at this point
       EVENT_INFO  sEventInfo;        //captures all other streams' info
}EVENT_TRACK_INFO;
struct StreamSegDir
{
       DWORD      dwStreamID;         //same as four CC
       DWORD      dwSegmentNumber;
       DWORD      dwStreamState;      //active, paused . . .
       DWORD      dwSegStartMark;     //time, event
       DWORD      dwSegEndmark;       //time, event
       DWORD      dwStreamOffSet;     //offset into stream
}STREAM_SEG_DIR_ENTRY;
struct StreamSegDirTable
{
       DWORD      dwNumDirEntries;    // (# of streams) X (segments in
                                      // each stream)
       STREAM_SEG_DIR_ENTRY aStreamSegDirEntry[dwNumDirEntries];
}STREAM_SEG_DIR_TABLE;
struct StreamInfoTag
{
       DWORD  dwStreamID;  // fourCC code, determined by uStreamType
       union StreamSpeificInfo
       {
           VIDEO_INFO  sVideoInfo;
           AUDIO_INFO  sAudioInfo;
           DATA_INFO   sDataInfo;
       }STREAM_SPECIFIC_INFO;
}STREAM_INFO;
struct FileInfoTag
{
       UINT        uFormat;
       int         nNumberOfStreams;
       BOOL        bTimeTrackPresent;
       DWORD              dwNumTimeTrackEntries;
       BOOL        bEventTrackPresent;
       DWORD              dwNumEventTrackEntries;
       int         nNumberOfVideoStreams;
       int         nNumberOfAudioStreams;
       int         nNumberOfDataStreams;
       VIDEO_INFO  aVideoInfo[nNumberOfVideoStreams];
       AUDIO_INFO       aAudioInfo[nNumberOfAudioStreams];
       DATA_INFO   aDataInfo[nNumberOfDataStreams];
}FILE_INFO;
```

File Input/Output Services Definition

To support record and play needs, a set of high level record & play services are defined, as described hereinabove. To support the File I/O for these record and play services, the following high-level File I/O services are defined and described hereinbelow. As will be understood, implementation of the high level File I/O API is supported by a set of "lower level" file I/O Service Providers ("FSP"s). Referring once more to FIG. 6, RPFile 603 may for the present example be replaced with FileIO_ (not shown). When AVDAM 601 requests the creation/opening of a file through the Record & Play services, it specifies the required file format. Based on the requested file format, FileIO_ loads the appropriate Service Provider and carries out all the file I/O operations needed with the help of this service provider.

The goals of the File I/O API are:
Support record/play for sufficiently large number of streams This means that there should be support for creating and adding more number of data types/data streams than the ones envisioned now.

"Open" formats for streams-based on. AVI stream formats
The format for a specific stream is something that should not be dictated by the file I/O.

Support for multiple audio, video and "data" streams
Different products need support for record/play of different number of streams. As an example, some video conferencing products need support for at least two video and two audio streams. Any limit on the number of streams of a given type supported will be a lower level file format limitation (e.g: the .TAP format limits the # of audio and video streams to one each).

Support for stream-specific information that may be needed by the stream handler
It should be possible to add extra information on a per-stream basis; for example, annotation on a video stream.

Global (File scope) stream information

At the file scope, it should be possible to identify general information on streams present in a file.

File Scope TimeTrack Information

To facilitate an efficient file-scope/stream-scope seek mechanism, an optional "TimeTrack" stream is utilized. TT stream chunks are created by a FileIO_EnableTimeTrack (dwTimeInterval) call. The rate at which TT chunks are created depends on the time interval specified in dwTimeInterval. Since the TT stream can itself become quite large in size (discussed below), the TT stream is created with a unique ID and has fixed size chunks for efficiency purposes. Each chunk in this TT that has the following contents.

```
struct TimeTrackS
{
    DWORD    dwTimeStamp;              //(relative/abs)time at this point,
                                       // in milliseconds
    DWORD    dwOffsetTimeTrackInfo;    //offset into TimetTrack stream
} TIME_TRACK;
```

Note that each TT chunk has a pointer to a TimeTrackInfo (TTI) stream offset. This TTI stream is just another data stream with a unique fourCC code and each chunk of it has potentially variable length information. The actual data that goes into a TTI chunk is defined as TimeInfoChunk. Each TimeInfoChunk has one or more StreamIndexEntry item. Each StreamIndexEntry contains information on a stream that is open at that time. TTI stream consists of one or more TimeInfoChunks; the definition of TimeInfoChunk and StreamIndexEntry are shown below.

```
struct StreamIndexEntry
{
    DWORD    dwStreamId;       //fourCC
    DWORD    dwStreamStatus;   //active, paused ...
    DWORD    dwOffset;         //"sample #"
}STREAM_INDEX_ENTRY;
struct TimeInfoChunk
{
DWORD                dwNumIndexEntries;   //# of streams "open" now. .
STREAM_INDEX_ENTRY   aStreamIndexEntries[dwNumIndexEntries];
}TIME_TRACK_INFO;
```

File Scope Event Track Information

It is useful to have support for creation and usage of "event" markers in a recorded stream, as described hereinabove. For this purpose, an EventTrack(ETrack) stream is utilized. The idea is very similar to that of TimeTrack mentioned above; however, the difference lies in the fact there is no notion of any regularity (strict periodicity) in the ETrack; if there is a fixed periodicity to the ETrack, it essentially becomes very similar to TimeTrack. The idea is to support an event-based search mechanism to all the streams in a FileIO_file.

Etrack is created and updated by a FileIO_AddEventTrack(dwEventID) call. Thus, the first such call creates the ETrack stream with a unique streamID and writing an ETrack stream chunk, defined below as EVENT_TRACK_CHUNK; subsequent calls result in a ETrack stream chunk to be written into the ETrack stream.

```
struct StreamIndexEntry
{
    DWORD    dwStreamID;       //fourCC for this stream
    DWORD    dwOffset;         //"sample #"
    DWORD    DwStreamStatus;   //active, paused ...
}STREAM_INDEX_ENTRY;   //per-stream-entry
struct EventInfo
{
    DWORD              dwNumIndexEntries;   //# of open streams
    STREAM_INDEX_ENTRY aStreamIndexEntries[dwNumIndexEntries];
}EVENT_INFO;
struct EventtrackS
{
    DWORD         dwEventID;     //event ID; unique
    DWORD         dwTimeStamp;   //time at this point
    EVENT_INFO    sEventInfo;    //captures all other streams' info
}EVENT_TRACK_CHUNK;
```

File Scope Stream Segment Information

Each time an open stream is paused/all open streams are paused, a "segment" information entry is created for the streams affected. Such segment information entries are written as file-scope stream segment information, when the file is closed. This "segment information stream" will have a unique "StreamID," as will be appreciated by those skilled in the art.

```
struct StreamSegDir
{
    DWORD       dwStreamID;         //same as fourCC
    DWORD       dwSegmentNumber;
    DWORD       dwStreamState;      //active, paused, etc.
    DWORD       dwSegStartMark;     //time, event
    DWORD       dwSegEndmark;       //time,event
    DWORD       dwStreamOffSet;     //offset into stream
}STREAM_SEG_DIR_ENTRY
struct StreamSegDirTable
{
    DWORD                   dwNumDirEntries
    STREAM_SEG_DIR_ENTRY    aStreamSegDirEntry[dwNumDirEntries];
}STREAM_SEG_DIR_TABLE;
```

File I/O API

Various functions that are required to implement the file I/O API are grouped together as follows:

- Library scope operations—Initializate/Shutdown
- File scope functions—opening/closing operations, etc.
- File scope information—read/write operations
- Stream management—opening/closing/creation of streams
- Stream input/output—write/read operations
- Stream-sepcific information—write/read stream specific information

Library Scope Initialization/Shutdown Operations

Initialization int FileIO_Init(void)

Initalizes the FileIO_subsystem.

Return value—0, if successful

Shutdown int FileIO_ShutDown(void)

Performs the clean-up and shutdown of the FileIO_subsystem.

Return value—0, if successful

File scope operations

Opening a file

LONG FileIO_Open (OUT FILEHANDLE FAR*lphFileHandle, IN LPCSTR lpPath, IN UINT uFormat, IN UINT uMode)

Arguments:

lphFileHandle—a pointer to a FILEHANDLE; the location pointed to by lphFileHandle used to place a non-zero FILEHANDLE value if the operation is successful lpPath—points to a null terminated ASCII string that contains the path, including the file name, of the file to be opened uFormat—specifies the "low level" format (.TAP, .AVI, .PCS) that this file to be opened uses.

uMode—Specifies the mode with which the file is to be opened

Closing a file

LONG FileIO_Close(IN FILEHANDLE hFileHandle)

Arguments:

hFileHandle—specifies a valid FILEHANDLE, returned by a previous call to FileIO_Open Returns: 0, if successful

File Scope Information Management

Creating/Adding Time Track int FileIO_Enable TimeTrack(IN FILEHANDLE hFileHandle, IN DWORD dwTimeInterval)

dwTimeInterval—specifies the interval at which each TimeTrack entry has to be added; at each such interval, a Timetrack entry with appropriate stream information (offset, active/paused status etc.) for each open stream is added.

Creating/Adding Event Track int FileIO_AddEventTrack(IN FILEHANDLE hFileHandle, IN DWORD dwEventID)

dwEventID—unique Event marker. Creates/adds an EventTrack entry, with the current stream information (offsets, active/paused status etc. ) for each stream that is open and current time.

General file information

In addition to the above-specified file-scope data, a global file-scope information chunk (defined below in FILE_INFO structure) is created and added with a unique StreamID, when the file is closed.

int FileIO_WriteFileInfo(IN FILEHANDLE hFileHandle, IN LP_FILE_INFO lpFileInfo)

This information is intended to be used during playback, to assist the Record&Playback services and its clients with information on the recorded file.

A prototype of the FILE_INFO structure is shown below.

```
structFileInfoTag
{
    UINT        uFormat;
    int         nNumberOfStreams;
    BOOL        bTimeTrackPresent;
    DWORD       dwNumTimeTrackEntries;
    BOOL        bEventTrackPresent;
    DWORD       dwNumEventTrackEntries;
    int         nNumberOfVideoStreams;
    int         nNumberOfAudioStreams;
    int         nNumberOfDataStreams;
    VIDEO_INFO  aVideoInfo[nNumberOfVideoStreams];
    AUDIO_INFO  aAudioInfo[nNumberOfAudioStreams];
    DATA_INFO   aDataInfo[nNumberOfDataStreams];
}FILE_INFO;
```

Reading FileInfo int FileIO_ReadFileInfo(IN FILEHANDLE hFileHandle, IN LP_FILE_INFO lpFileInfo)

This function reads FILE_INFO data present in a file opened for READ.

hFileHandle—valid file handle lpFileInfo—a pointer to FILE_INFO structure, to read the data into.

Creating and writing additional file scope data:
LONG FileIO_WriteData(IN FILEHANDLE hFileHandle, IN DWORD dwStreamID, IN LPVOID lpData, IN LONG cbData)

Writes some additional data to the file.

Returns zero if successful; otherwise, it returns an error code.

hFileHandle—Specifies a handle to an open FileIO_file.

dwStreamID—Specifies a four-character code identifying the data.

lpData—Specifies a pointer to the data to write.

cbData—Specifies the size of the memory block referred to by lpData.

This function fails with a return value of FileIO_ERR_READONLY unless the file was opened with write permission.

Reading file scope additional data
LONG FileIO_ReadData(IN FILEHANDLE hFileHandle, IN DWORD dwStreamID, OUT LPVOID lpData, OUT LONG FAR*lpcbData)

Reads optional data from the file.

Returns zero if successful; otherwise, it returns an error code. The return value FileIO_ERR NODATA indicates that data with the requested four-character code (dwStreamID) does not exist.

hFileHandle—Specifies a handle to an open FileIO_file.

dwStreamID—Specifies a four-character code identifying the data.

lpData—Specifies a pointer to a buffer used to return the data read.

lpcbData—Specifies a pointer to a location indicating the size of the memory block referred to by lpData. If the read is successful, the value is changed to indicate the amount of data read.

Stream Management: Opening/closing/creation of Streams
Creating a stream (for WRITE)
LONG FileIO_CreateStream(IN FILEHANDLE hFileHandle, OUT LP_FileIO_STREAM FAR*lppFileIO_Stream, IN FileIO_STREAMINFO FAR*lpFileIO_StreamInfo)

Creates a new stream in an existing file, and returns a stream-interface pointer for it.

Returns zero if successful; otherwise, it returns an error code.

hFileHandle—Specifies a handle to an open FileIO_file.

lppFileIO_Stream—Specifies a pointer used to return the new stream-interface pointer.

lpFileIO_StreamInfo—Specifies a pointer to a structure containing information about the new stream. This structure contains the type of the new stream and its sample rate.

This function fails with a return value of FileIO_ERR_READONLY unless the file was opened with write permission.

Opening a stream (for READ)
LONG FileIO_OpenStream(IN FILEHANDLE hFileHandle, OUT PFileIO_STREAM FAR*ppFileIO_Stream, IN DWORD dwStreamID)

Returns zero if successful; otherwise, it returns an error code. Possible error codes include: (no stream in the file corresponding to the values passed in for dwStreamID.)

hFileHandle—Specifies a handle to an open FileIO_file.

ppFileIO_Stream—Specifies a pointer to the return location for the new stream-interface pointer.

dwStreamID—Specifies an ID (four-character code) indicating the type of stream to be opened. Zero is a reserved stream id.

Balance each call to FileIO_OpenStream with a call to FileIO_StreamClose using the stream handle returned.

Closing a Stream
LONG FileIO_StreamClose(IN FileIO_STREAM pFileIO_Stream)

Closes an open stream specified by pFileIO_Stream

Returns the current reference count of the stream. This value should only be used for debugging purposes.

pFileIO_Stream—Specifies a handle to an open stream.

Reading a stream header
LONG FileIO_ReadStreamInfo(FileIO_STREAM pFileIO_Stream, LPFileIO_STREAMINFO FAR*l pFileIO_StreamInfo, LONG lSize)

Obtains stream header information.

Returns zero if successful; otherwise, it returns an error code.

pFileIO_Stream—Specifies a handle to an open stream.

pFileIO_StreamInfo—Specifies a pointer to a structure used to return stream information.

lSize—Specifies the size of the structure used for LPFileIO_STREAMINFO

Stream Input/output: Write/read Operations
Reading Data from a Stream
LONG FileIO_StreamRead(IN FileIO_STREAM hFileIO_Stream, IN LONG lStart, IN LONG lSamples, OUT LPVOID lpBuffer, IN LONG cbBuffer, OUT LONG FAR*plBytes, OUT LONG FAR*plSamples)

Reads data from a stream.

Returns zero if successful; otherwise, it returns an error code. Use plBytes and plSamples to find out how much was actually read.

Possible errors include:

FileIO_ERR_BUFFERTOOSMALL, FileIO_ERR_MEMORY, FileIO_ERR_FILEREAD

Arguments:

hFileIO_Stream—Specifies a handle to an open stream.

lStart—Specifies the starting "sample" to read. For audio data, samples correspond to a block of audio data; for video, it is a video frame lSamples—Specifies the number of "samples" to read.

lpBuffer—Specifies a pointer to a buffer used to return the data.

cbBuffer—Specifies the size of buffer pointed to by lpBuffer.

lplBytes—Specifies a pointer to the location used to return the number of bytes of data written into the buffer for lpBuffer. plBytes can be NULL.

lplSamples—Specifies a pointer to the location used to return the number of samples written into the buffer for lpBuffer. plSamples can be NULL.

If lpBuffer is NULL, this function does not read any data; it returns information about the size of data that would be read.

Writing Data into an Existing Stream
LONG FileIO_StreamWrite(IN FileIO_STREAM hFileIO_Stream, IN LONG lStart, IN LONG lSamples, IN LPVOID lpBuffer, IN LONG cbBuffer, IN DWORD dwFlags, OUT LONG FAR* lplSampWritten, OUT LONG FAR*lplBytesWritten)

Writes data to a stream.

Returns zero if successful; otherwise, it returns an error code.

hFileIO_Stream—Specifies a handle to an open stream.

lStart—Specifies the starting sample to write.

lSamples—Specifies the number of samples to write.

lpBuffer—Specifies a pointer to buffer containing the data to write.

cbBuffer—Specifies the size of buffer used by lpBuffer.

dwFlags—Specifies any flags associated with this data. The following flag is defined for video streams: FileIO_F_KEYFRAME lplSampWritten—Specifies a pointer to a location used to return the number of samples written. This can be set to NULL.

lplBytesWritten—Specifies a pointer to a location used to return the number of bytes written. This can be set to NULL.

Stream-specific Information: Write/read Stream Specific Information

Reading optional stream header information

LONG FileIO_StreamReadData(IN FileIO_STREAM hFileIO_Stream, IN DWORD dwStreamId, OUT LPVOID lpData, OUT LONG FAR*lpcbData)

Reads optional header data from a stream.

Returns zero if successful; otherwise, it returns an error code. The return value FileIO_ERR_NODATA indicates the system could not find any data with the specified chunk ID.

hFileIO_Stream—Specifies a handle to an open stream.

dwStreamID—Specifies a four-character code identifying the data.

lpData—Specifies a pointer to be used to return the data read.

lpcbData—Points to a location which specifies the buffer size used for lpData. If the read is successful, FileIO_ changes this value to indicate the amount of data written into the buffer for lpData.

Writing Additional Stream Data

LONG FileIO_Stream WriteData(IN FileIO_STREAM hFileIO_Stream, IN DWORD dwStreamId, IN LPVOID lpData, IN LONG cbData)

Writes optional data to the stream.

Returns zero if successful; otherwise, it returns an error code.

hFileIO_Stream—Specifies a handle to an open stream.

dwStreamId—Specifies a four-character code identifying the data.

lpData—Specifies a pointer to a buffer containing the data to write.

cbData—Indicates the number of bytes of data to be copied from lpData into the stream.

This call fails with a return value of FileIO_ERR_READONLY unless the file was opened with write permission.

As will be understood, the present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for event tagging of at least one audio, video, or data (AVD) stream, each AVD stream comprising a plurality of AVD stream chunks, the method comprising the steps of:

(a) storing the at least one AVD stream; and (b) storing an event tag in response to a signal indicating the beginning of an event, the event tag having an event stream information data (ESID) structure comprising an ESID entry for each AVD stream of the at least one AVD stream, each ESID entry comprising an offset for locating a corresponding AVD stream chunk of each active AVD stream of the at least one AVD stream.

2. The method of claim 1, wherein the signal is generated by a user.

3. The method of claim 1, wherein the signal is generated automatically by the computer in accordance with a preselected event type.

4. The method of claim 1, the event tag further comprising an event identifier for identifying the event and a time stamp for indicating the time of the corresponding AVD stream chunk for each of the at least one AVD stream corresponding to the beginning of the event.

5. The method of claim 4, wherein the time stamp indicates the absolute time of the corresponding AVD stream chunk for each of the at least one AVD stream corresponding to the beginning of the event.

6. The method of claim 1, wherein:

the ESID structure further comprises a number of entries field for indicating the number of ESID entries in the ESID structure; and each ESID entry further comprises a stream identifier field for identifying the corresponding AVD stream and a stream status field for indicating the current status of the corresponding AVD stream.

7. The method of claim 6, the event tag further comprising an event identifier for identifying the event and a time stamp for indicating the time of the corresponding AVD stream chunk for each of the at least one AVD stream corresponding to the beginning of the event.

8. The method of claim 7, wherein the event identifier is unique and is mapped to a symbolic name that describes the event.

9. The method of claim 7, wherein the status field of each SIDS chunk entry indicates whether the corresponding AVD stream is active paused, active unpaused, or inactive.

10. The method of claim 7, wherein:

the at least one AVD stream comprises at least two AVD streams of a data conference between at least two users;

each AVD stream of the at least two AVD streams has a unique conference identifier; and the identifier field of each SIDS chunk entry identifies the unique conference identifier for the corresponding AVD stream.

11. The method of claim 7, wherein:

the offset of each ESID entry is a 32-bit pointer;

the stream identifier field of each ESID entry is a 32-but stream identifier field;

the stream status field of each ESID entry is a 32-but stream status field;

the event identifier is a 32-bit event identifier field;

the time stamp is a 32-bit time stamp field; and the number of entries field is a 32-bit number of entries field.

12. The method of claim 1, further comprising the step of:
(c) storing a sequence of event tags for a plurality of corresponding events in an event track.

13. The method of claim 1, wherein each AVD chunk of an AVD stream of the at least two AVD streams is a chunk of data in accordance with whether the AVD stream is an audio, video, or data stream.

14. The method of claim 13, wherein each AVD chunk of an AVD stream of the at least two AVD streams is a video frame if the each AVD chunk is a video stream and an audio sample if the each AVD chunk is an audio stream.

15. An apparatus for event tagging of at least one audio, video, or data (AVD) stream, each AVD stream comprising a plurality of AVD stream chunks, the apparatus comprising:
(a) means for storing the at least one AVD stream; and
(b) means for storing an event tag in response to a signal indicating the beginning of an event, the event tag having an event stream information data (ESID) structure comprising an ESID entry for each AVD stream of the at least one AVD stream, each ESID entry comprising an offset for locating a corresponding AVD stream chunk of each active AVD stream of the at least one AVD stream.

16. The apparatus of claim 15, wherein the signal is generated by a user.

17. The apparatus of claim 15, wherein the signal is generated automatically by the computer in accordance with a preselected event type.

18. The apparatus of claim 15, the event tag further comprising an event identifier for identifying the event and a time stamp for indicating the time of the corresponding AVD stream chunk for each of the at least one AVD stream corresponding to the beginning of the event.

19. The apparatus of claim 18, wherein the time stamp indicates the absolute time of the corresponding AVD stream chunk for each of the at least one AVD stream corresponding to the beginning of the event.

20. The apparatus of claim 15, wherein:
the ESID structure further comprises a number of entries field for indicating the number of ESID entries in the ESID structure; and
each ESID entry further comprises a stream identifier field for identifying the corresponding AVD stream and a stream status field for indicating the current status of the corresponding AVD stream.

21. The apparatus of claim 20, the event tag further comprising an event identifier for identifying the event and a time stamp for indicating the time of the corresponding AVD stream chunk for each of the at least one AVD stream corresponding to the beginning of the event.

22. The apparatus of claim 21, wherein the event identifier is unique and is mapped to a symbolic name that describes the event.

23. The apparatus of claim 21, wherein the status field of each SIDS chunk entry indicates whether the corresponding AVD stream is active paused, active unpaused, or inactive.

24. The apparatus of claim 21, wherein:
the at least one AVD stream comprises at least two AVD streams of a data conference between at least two users;
each AVD stream of the at least two AVD streams has a unique conference identifier; and
the identifier field of each SIDS chunk entry identifies the unique conference identifier for the corresponding AVD stream.

25. The apparatus of claim 21, wherein:
the offset of each ESID entry is a 32-bit pointer;
the stream identifier field of each ESID entry is a 32-but stream identifier field;
the stream status field of each ESID entry is a 32-but stream status field;
the event identifier is a 32-bit event identifier field;
the time stamp is a 32-bit time stamp field; and
the number of entries field is a 32-bit number of entries field.

26. The apparatus of claim 15, further comprising:
(c) means for storing a sequence of event tags for a plurality of corresponding events in an event track.

27. The apparatus of claim 15, wherein each AVD chunk of an AVD stream of the at least two AVD streams is a chunk of data in accordance with whether the AVD stream is an audio, video, or data stream.

28. The apparatus of claim 27, wherein each AVD chunk of an AVD stream of the at least two AVD streams is a video frame if the each AVD chunk is a video stream and an audio sample if the each AVD chunk is an audio stream.

29. A computer-readable medium having stored thereon a plurality of instructions for event tagging of at least one audio, video, or data (AVD) stream, each AVD stream comprising a plurality of AVD stream chunks, wherein the plurality of instructions, when executed by a processor of a computer, cause the processor to perform the steps of:
(a) storing the at least one AVD stream; and
(b) storing an event tag in response to a signal indicating the beginning of an event, the event tag having an event stream information data (ESID) structure comprising an ESID entry for each AVD stream of the at least one AVD stream, each ESID entry comprising an offset for locating a corresponding AVD stream chunk of each active AVD stream of the at least one AVD stream.

30. The computer-readable medium of claim 29, wherein the signal is generated by a user.

31. The computer-readable medium of claim 29, wherein the signal is generated automatically by the computer in accordance with a preselected event type.

32. The computer-readable medium of claim 29, the event tag further comprising an event identifier for identifying the event and a time stamp for indicating the time of the corresponding AVD stream chunk for each of the at least one AVD stream corresponding to the beginning of the event.

33. The computer-readable medium of claim 32, wherein the time stamp indicates the absolute time of the corresponding AVD stream chunk for each of the at least one AVD stream corresponding to the beginning of the event.

34. The computer-readable medium of claim 29, wherein:
the ESID structure further comprises a number of entries field for indicating the number of ESID entries in the ESID structure; and
each ESID entry further comprises a stream identifier field for identifying the corresponding AVD stream and a stream status field for indicating the current status of the corresponding AVD stream.

35. The computer-readable medium of claim 34, the event tag further comprising an event identifier for identifying the event and a time stamp for indicating the time of the corresponding AVD stream chunk for each of the at least one AVD stream corresponding to the beginning of the event.

36. The computer-readable medium of claim 35, wherein the event identifier is unique and is mapped to a symbolic name that describes the event.

37. The computer-readable medium of claim 35, wherein the status field of each SIDS chunk entry indicates whether the corresponding AVD stream is active paused, active unpaused, or inactive.

38. The computer-readable medium of claim 35, wherein:

the at least one AVD stream comprises at least two AVD streams of a data conference between at least two users;

each AVD stream of the at least two AVD streams has a unique conference identifier; and the identifier field of each SIDS chunk entry indentifies the unique conference identifier for the corresponding AVD stream.

39. The computer-readable medium of claim 35, wherein:

the offset of each ESID entry is a 32-bit pointer;

the stream identifier field of each ESID entry is a 32-but stream identifier field;

the stream status field of each ESID entry is a 32-but stream status field;

the event identifier is a 32-bit event identifier field;

the time stamp is a 32-bit time stamp field; and the number of entries field is a 32-bit number of entries field.

40. The computer-readable medium of claim 29, wherein the plurality of instructions cause the processor to perform the step of:

(c) storing a sequence of event tags for a plurality of corresponding events in an event track.

41. The computer-readable medium of claim 29, wherein each AVD chunk of an AVD stream of the at least two AVD streams is a chunk of data in accordance with whether the AVD stream is an audio, video, or data stream.

42. The computer-readable medium of claim 41, wherein each AVD chunk of an AVD stream of the at least two AVD streams is a video frame if the each AVD chunk is a video stream and an audio sample if the each AVD chunk is an audio stream.

43. A computer system, comprising:

a processor; and a memory coupled to the processor, wherein the memory stores a plurality of instructions for event tagging of at least one audio, video, or data (AVD) stream, each AVD stream comprising a plurality of AVD stream chunks, wherein:

(a) the at least one AVD stream is stored; and (b) an event tag is stored in response to a signal indicating the beginning of an event, the event tag having an event stream information data (ESID) structure comprising an ESID entry for each AVD stream of the at least one AVD stream, each ESID entry comprising an offset for locating a corresponding AVD stream chunk of each active AVD stream of the at least one AVD stream.

44. The computer system of claim 43, the event tag further comprising an event identifier for identifying the event and a time stamp for indicating the time of the corresponding AVD stream chunk for each of the at least one AVD stream corresponding to the beginning of the event.

45. The computer system of claim 43, wherein:

the ESID structure further comprises a number of entries field for indicating the number of ESID entries in the ESID structure; and each ESID entry further comprises a stream identifier field for identifying the corresponding AVD stream and a stream status field for indicating the current status of the corresponding AVD stream.

46. The computer system of claim 45, the event tag further comprising an event identifier for identifying the event and a time stamp for indicating the time of the corresponding AVD stream chunk for each of the at least one AVD stream corresponding to the beginning of the event.

47. The computer system of claim 46, wherein the event identifier is unique and is mapped to a symbolic name that describes the event.

48. The computer system of claim 46, wherein the status field of each SIDS chunk entry indicates whether the corresponding AVD stream is active paused, active unpaused, or inactive.

49. The computer system of claim 46, wherein:

the at least one AVD stream comprises at least two AVD streams of a data conference between at least two users;

each AVD stream of the at least two AVD streams has a unique conference identifier; and the identifier field of each SIDS chunk entry identifies the unique conference identifier for the corresponding AVD stream.

50. The computer system of claim 46, wherein:

the offset of each ESID entry is a 32-bit pointer;

the stream identifier field of each ESID entry is a 32-but stream identifier field;

the stream status field of each ESID entry is a 32-but stream status field;

the event identifier is a 32-bit event identifier field;

the time stamp is a 32-bit time stamp field; and the number of entries field is a 32-bit number of entries field.

* * * * *